United States Patent [19]

Mosch

[11] 4,044,482
[45] Aug. 30, 1977

[54] WARNING DEVICE

[76] Inventor: Alfred Mosch, 9705 NW. 70 St., Tamarac, Fla. 33321

[21] Appl. No.: 670,351

[22] Filed: Mar. 25, 1976

[51] Int. Cl.² ............................................. B60Q 7/02
[52] U.S. Cl. .................................. 40/129 C; 116/28 R
[58] Field of Search ................... 116/28 R; 40/129 C, 40/134, 130 R; 240/2 R, 7.1 R

[56] References Cited

U.S. PATENT DOCUMENTS

| | | | |
|---|---|---|---|
| 2,652,650 | 9/1953 | Helms | 40/129 C |
| 3,004,359 | 10/1961 | Pisciotta | 40/129 C |
| 3,255,725 | 6/1966 | Von Kreidner | 116/28 |
| 3,276,416 | 10/1966 | Dirks | 116/28 R |
| 3,594,938 | 7/1971 | Mosch | 40/129 C |
| 3,761,890 | 9/1973 | Fritts | 116/28 R |

*Primary Examiner*—S. Clement Swisher
*Assistant Examiner*—Denis E. Corr
*Attorney, Agent, or Firm*—Ernest F. Marmorek

[57] ABSTRACT

An optical warning device has a sign that is mounted on the inner surface of the lid of a vehicle compartment, and a light source that illuminates the sign.

8 Claims, 3 Drawing Figures

4,044,482

WARNING DEVICE

CROSS-REFERENCE TO RELATED APPLICATIONS

Reference is had to related application and patents by the present inventor: U.S. Pat. No. 3,594,938, dated July 27, 1971; U.S. Pat. No. 3,763,585, dated Oct. 9, 1973; application Ser. No. 613,916 filed on Sept. 16, 1975 now abandoned (Continuation of application Ser. No. 354,219 filed Apr. 25, 1973, now abandoned).

BACKGROUND OF THE INVENTION

The invention relates to a warning device for automobiles or other vehicles, for use especially when such vehicles are stopped along a road side where there may be danger of collision with another, moving, vehicle, and danger of personal injury of such other moving vehicle to a person attempting to repair the stopped automobile.

There are known electrical warning devices for use on motor vehicles, an example of which is the emergency light flashers which are attached to the lower portions of a vehicle. A disadvantage of this type of warning device is that it is not seen in the day time and can be readily obstructed by persons standing on the road working around the vehicle.

SUMMARY OF THE INVENTION

A warning device according to the instant invention, may be conveniently installed in new vehicles by vehicle manufacturers to provide a signaling means in the event, for example, that a vehicle must be stopped, partially blocking a roadway. With the constructions set forth below, it could be conveniently made a standard part of every new vehicle. Likewise it may be installed in existing vehicles.

According to the instant invention, symbols and messages of caution may be painted or otherwise applied to a sheet of material such as paperboard, wood, metal, plastic or other similar material suited for the purpose. This sheet may then be mounted on the inner surface of a lid of a compartment on the vehicle such as the trunk lid or the lid over the engine compartment. Alternately, the warning symbols or message may be applied directly to the inner surface of the trunk lid, such as by spray painting and stenciling. Reflecting paints, reflecting tapes, and other similar materials having especially high reflecting ability are well-known, and may be advantageously applied for producing a warning sign according to the instant invention.

A second important feature of the instant invention is an illuminating means mounted on the vehicle and operable to illuminate the warning sign when the lid is open.

The illuminating means projects light against the sign making it visible over extended distances. Should the illuminating means fail, such as would be the case if the battery were inoperative, the warning sign itself would still be visible whereby the warning function of the device, although greatly attentuated, would still be operative.

Further objects and advantages of the invention will be set forth in part in the following specification and in part will be obvious therefrom without being specifically referred to, the same being realized and attained as pointed out in the claims hereof.

Other objects of the invention will in part be obvious and will in part appear hereinafter.

With the above and other objects of the invention in view, the invention consists in the novel construction, arrangement and combination of various devices, elements and parts, as set forth in the claims hereof, certain embodiments of the same being illustrated in the accompanying drawings and described in the specification.

The invention accordingly comprises the features of construction, combination of elements and arrangement of parts which will be exemplified in a construction hereinafter set forth and the scope of the application of which will be indicated in the claims.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENTS

Figure 1:
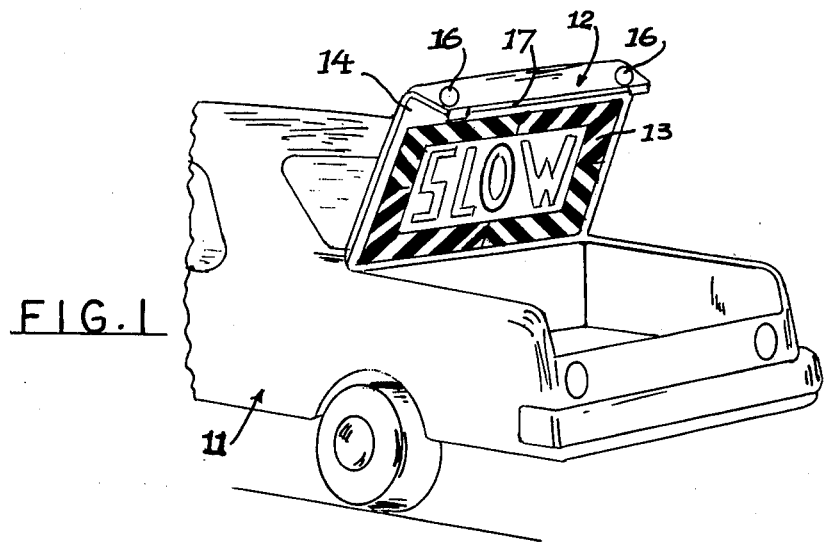
FIG. 1 is a fragmentary perspective view, showing an embodiment of the instant invention mounted on the lid of a compartment of a vehicle.
Figure 2:
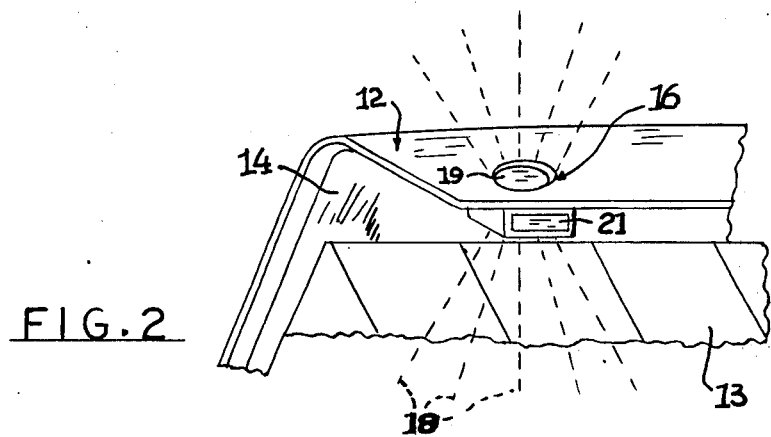
FIG. 2 is a large scale fragmentary perspective view of the lid showing in greater detail the illuminating means of FIG. 1.

In carrying the invention into effect in the embodiments which have been selected for illustration in the accompanying drawings and for description in the specification, and referring now particularly to FIGS. 1 and 2, a vehicle 11 has an open compartment lid 12 that carries a warning sign 13. The sign 13 is disposed on the inner surface 14 of the lid 12.

Illuminating means 16, which may be combined with the emergency light flashers currently required on automobiles, are shown located near opposite corners of the lid 12 and lid edge 17 which is outwardly directed when lid 12 is open as shown in FIG. 1.

The illuminating means 16 are shown, in the embodiment of FIGS. 1 and 2, with a means for directing light to illuminate the warning sign such as a lens so located that it projects light rays 18. This means may be combined with a a means for directing light in an upward direction, such as a lens 19 and a means for directing light in an outward direction away from the lid 12, in a substantially horizontal direction, such as a lens 21.

Figure 3:
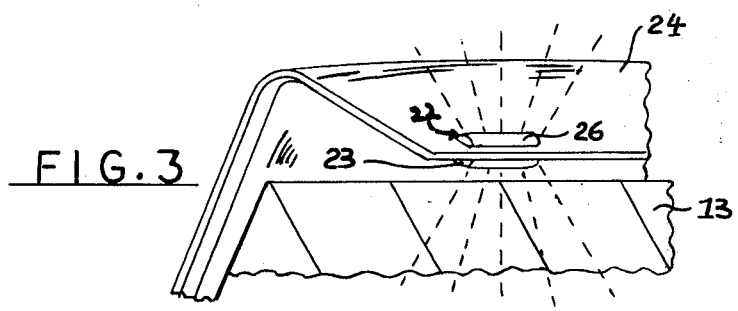
FIG. 3 is a fragmentary perspective view similar to FIG. 2, but embodying a modified illuminating means.

The modification shown in FIG. 3 is similar to the embodiment shown in FIGS. 1 and 2. It provides for illuminating means 22 that, however, comprises only two means for directing light away from the lid 24 over a 180° arc, such as a lens 26.

The sign 13 may be first produced on a sheet of cardboard, wood, plastic, paperboard, or other suitable material, and then mounted on the inner surface 14 of the lid 12 or 24, or may be applied directly onto the inner surface 14 of the lid. A verbal warning message, for example SLOW may be applied to the sign 13 as shown in FIG. 1. In a preferred embodiment, the sign 13 or at least the verbal message is composed of reflective material such as reflective paints or reflective tape. The illuminating means 16 (FIGS. 1, 2) or 23, 26 (FIG. 3) may have a light source which is either constant or flashing.

OPERATION

The operation of the above described embodiments of the invention is as follows:

The lid 12, 24 is open displaying the sign 13, which in the embodiment shown in FIG. 1, displays the sign 13 in a rearward direction. The illuminating means 16 which is activated by means of a switch (not shown) in any well-known manner, projects its light rays 18 towards the sign 13.

Additionally, light is also projected from the illuminating means 16 by the lenses 16, 21, shown in FIGS. 1 and 2. In FIG. 3, the lens 23 projects light onto the warning sign and both the lenses 23 and 26 project light in a direction horizontally away from the lid 12. This provides an additional visible signal to approaching vehicles. The lens 19, shown in FIGS. 1 and 2, and the lens 26 shown in FIG. 3, additionally project light in an upward direction, providing for further enhanced visibility to oncoming vehicles. As a result of being disposed on the upper end of the open lid 12, the illuminating means is, during use, disposed at a maximum height above the ground and is therefore visible from a greater distance away than normally more lower mounted emergency flashers.

For the embodiment wherein the sign is composed of highly reflective materials, it remains effective as an emergency warning device by reflecting the lights oncoming of oncoming vehicles at night even if the illuminating means 16 is of reduced intensity of inoperative due to the failure of the vehicles battery or a bulb in the illuminating device 16.

In the preferred embodiment, the size of the warning sign is such as to essentially completely cover the inner surface 14 of the lid 12. This provides for maximum visibility and readability. Additionally, if someone working around the car partially blocks the lid 12 a large portion of the sign will still be visible to oncoming vehicles.

The instant invention may be adapted for use on the lid of a forward compartment of a vehicle to warn oncoming vehicles from the forward direction and is not intended for use only on a rear vehicle compartment lid.

I wish it to be understood that I do not desire to be limited to the exact details of construction shown and described, for obvious modifications will occur to a person skilled in the art.

Having thus described the invention, what I claim as new and desire to be secured by Letters patent, is as follows:

1. An optical warning device, for use in connection with the lid of a compartment of a vehicle, said lid having an inner surface disposed in the compartment when the lid is closed and, respectively, being visible from outside said vehicle when said lid is open; comprising, in combination:
   an optical warning sign mounted on said inner surface of said lid; and
   illuminating means spaced apart from said sign and being mounted on and through said lid and operable to illuminate said sign when the lid is open and including a light source spaced apart from said sign and being operable to direct light towards said sign to be reflected by said sign; said illuminating means additionally comprising both means for directing light in an upward direction away from said lid, and means for directing light in an outward direction away from said lid in a substantially horizontal direction.

2. In an optical device, as claimed in claim 1, said sign comprising a highly reflective material and substantially covering the entire inner surface of said lid.

3. In an optical warning device, as claimed in claim 1, said illuminating means including:
   means operable to project light towards the interior of said compartment and onto said sign when said lid is open, and to project light towards the outside of said lid over a 180° arc.

4. In an optical device, as claimed in claim 3, said sign comprising a highly reflective material and substantially covering the entire inner surface of said lid.

5. In an optical device, as claimed in claim 1, said sign substantially covering the entire inner surface of said lid.

6. In an optical device, as claimed in claim 1, said sign being mounted on said inner surface by application; as a surface coating, to form an integral unit with said inner surface.

7. In an optical device, as claimed in claim 1, said sign comprising highly reflective material.

8. In an optical device, as claimed in claim 1, said sign including a verbal optical warning message.

* * * * *